United States Patent
Baumann et al.

(10) Patent No.: US 7,172,056 B2
(45) Date of Patent: Feb. 6, 2007

(54) FRICTION BRAKE WITH MECHANICAL SELF-BOOSTING AND METHOD FOR ITS ACTUATION

(75) Inventors: Dietmar Baumann, Hemmingen (DE); Dirk Hofmann, Ludwigsburg (DE); Herbert Vollert, Vaihingen/Enz (DE); Willi Nagel, Remseck/Hochdorf (DE); Andreas Henke, Diemelstadt (DE); Bertram Foitzik, Ludwigsburg (DE); Bernd Goetzelmann, Moeglingen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/853,119

(22) Filed: May 26, 2004

(65) Prior Publication Data

US 2004/0238294 A1    Dec. 2, 2004

(30) Foreign Application Priority Data

May 30, 2003    (DE)    ................. 103 24 424

(51) Int. Cl.
  *F16D 55/14*    (2006.01)
  *F16D 55/08*    (2006.01)
(52) U.S. Cl. ............... 188/72.2; 188/72.7; 188/72.9
(58) Field of Classification Search .......... 188/72.7, 188/72.9, 72.1, 72.6, 71.8–71.9, 140 A, 156, 188/158, 161–165, 106 F, 106 P, 41–44, 188/231, 234, 72.2, 250 R, 73.42, 70 R, 188/70 B, 217
See application file for complete search history.

(56) References Cited

U.S. PATENT DOCUMENTS

| | | | | |
|---|---|---|---|---|
| 469,013 A | * | 2/1892 | Des Georges | 188/136 |
| 654,809 A | * | 7/1900 | Sauvage | 188/136 |
| 2,435,465 A | * | 2/1948 | Brown | 188/18 A |
| 2,808,129 A | * | 10/1957 | Kraus | 188/71.4 |
| 2,953,221 A | * | 9/1960 | Lucien | 188/72.9 |
| 3,185,258 A | * | 5/1965 | Douglas | 188/72.2 |
| 3,207,267 A | * | 9/1965 | Beuchle et al. | 188/72.2 |
| 3,460,651 A | * | 8/1969 | Burnett | 188/72.6 |
| 3,463,274 A | * | 8/1969 | Hollnagel et al. | 188/72.7 |
| 3,487,895 A | * | 1/1970 | Hermann | 188/71.8 |
| 3,489,251 A | * | 1/1970 | Swift | 188/72.6 |
| 3,545,573 A | * | 12/1970 | Barton | 188/72.9 |
| 3,647,031 A | * | 3/1972 | Burnett | 188/72.6 |
| 3,664,469 A | * | 5/1972 | Maurice | 188/72.9 |
| 3,690,417 A | * | 9/1972 | Airheart | 188/71.8 |
| 3,703,944 A | * | 11/1972 | Hendrickson | 188/72.2 |
| 3,768,603 A | * | 10/1973 | Hoffman | 188/72.3 |
| 3,809,190 A | * | 5/1974 | Evans | 188/72.2 |
| 3,809,191 A | * | 5/1974 | Woodward | 188/106 A |
| 3,853,206 A | * | 12/1974 | Kibler et al. | 188/72.9 |

(Continued)

FOREIGN PATENT DOCUMENTS

DE    3032992    *    4/1982

(Continued)

*Primary Examiner*—Pam Rodriguez
(74) *Attorney, Agent, or Firm*—Ronald E. Greigg

(57) ABSTRACT

A disk brake having a first friction brake lining, which for braking can be pressed against a brake disk by pivoting of a support lever. A brake caliper is embodied as a floating caliper and an adjusting device is provided with which a second friction brake lining is adjustable transversely to the brake disk. In this way, a support angle ($\alpha$) and thus a magnitude of the self-boosting of the disk brake can be varied.

8 Claims, 1 Drawing Sheet

U.S. PATENT DOCUMENTS

| | | | |
|---|---|---|---|
| 3,869,024 A * | 3/1975 | Hauth et al. | 188/72.5 |
| 4,042,073 A * | 8/1977 | Dickenson | 188/72.9 |
| 4,223,764 A * | 9/1980 | Flotow | 188/72.7 |
| 4,852,699 A * | 8/1989 | Karnopp et al. | 188/72.2 |
| 6,386,336 B2 * | 5/2002 | Mohr et al. | 188/106 F |
| 6,412,608 B1 * | 7/2002 | Mohr et al. | 188/72.9 |
| 6,845,853 B2 * | 1/2005 | Baumann et al. | 188/72.9 |
| 2004/0134723 A1 * | 7/2004 | Baumann et al. | 188/72.2 |
| 2004/0154881 A1 * | 8/2004 | Baumann et al. | 188/72.2 |
| 2004/0238294 A1 * | 12/2004 | Baumann et al. | 188/72.1 |

FOREIGN PATENT DOCUMENTS

| | | | |
|---|---|---|---|
| DE | 4131631 A1 * | | 3/1993 |
| DE | 19508034 A1 * | | 9/1996 |
| DE | 19900029 | * | 7/2000 |
| DE | 10105752 A1 * | | 9/2002 |
| DE | 10201607 | * | 7/2003 |
| DE | 103 36 368 A1 | | 4/2004 |
| DE | 10324424 | * | 12/2004 |
| GB | 1 431 836 | | 4/1976 |
| WO | WO 02/095257 A2 | | 11/2002 |

* cited by examiner

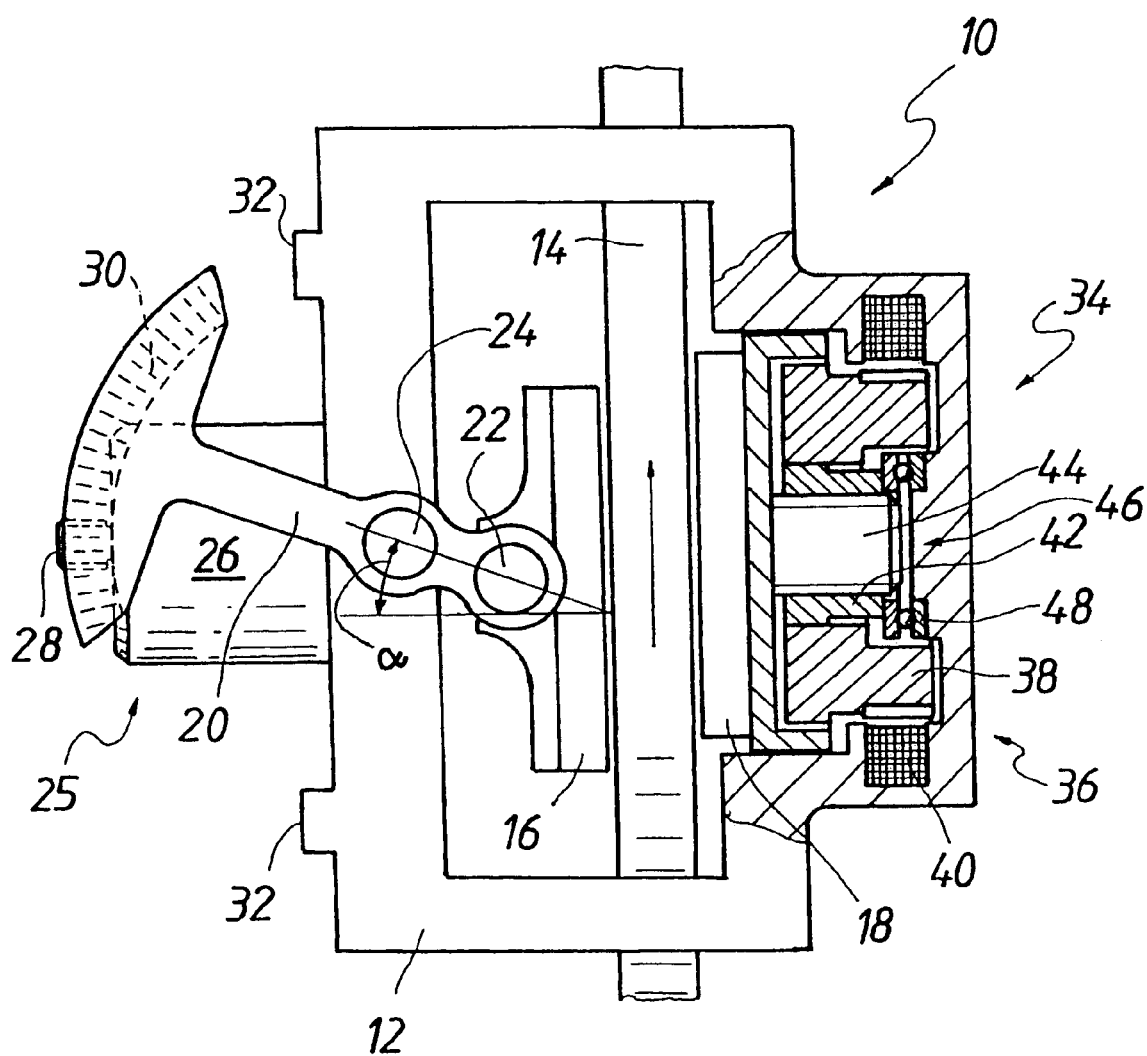

FRICTION BRAKE WITH MECHANICAL SELF-BOOSTING AND METHOD FOR ITS ACTUATION

BACKGROUND OF THE INVENTION

1. Field of the Invention

The invention relates to an improved friction brake with mechanical self-boosting for a motor vehicle and to a method for operating such a friction brake.

2. Description of the Prior Art

A friction brake of the type with which this invention is concerned is known from German Patent Disclosure DE 101 05 752 A1 which discloses a friction brake embodied as an electromechanically actuatable disk brake. It has a friction brake lining, which is pivotably connected to a support element that in turn is pivotably connected to an abutment in a brake caliper. For actuating the friction brake, the support element is pivotable, which causes the friction brake lining to come to rest on a brake disk that forms a brake body. The support element braces the friction brake lining at a support angle that is oblique to the brake disk. Because of the oblique bracing of the friction brake lining, a frictional force exerted on the friction brake lining by the rotating brake disk creates a force component transverse to the brake disk, or in other words a pressing force with which the friction brake lining is pressed against the brake disk. Some of the pressing force to be exerted for braking is thus brought to bear via the support element, and only the remainder of the pressing force has to be brought to bear by an actuating device. The support element can therefore be thought of as a self-boosting device. The support angle at which the support element braces the friction brake lining obliquely to the brake disk determines a magnitude of the self-boosting. If the support angle is adjustable, then the magnitude of the self-boosting is both adjustable and settable.

OBJECT AND SUMMARY OF THE INVENTION

The friction brake of the invention has an adjusting device with which a spacing of the abutment from the brake body is settable. If the friction brake is embodied as a disk brake with a floating caliper, the adjusting device can, similarly to a wear readjusting device, be disposed on a side of a brake disk, which forms the brake body, that is remote from a first friction brake lining and can move a second friction brake lining transversely to the brake disk; the term "transversely" is also understood to mean a motion with a component that is transverse to the brake disk. In this way, the spacing of the abutment from the brake disk forming the brake body is set indirectly. The friction brake of the invention is, however, not limited to such disk brakes; for instance, it can also be realized in disk brakes with a fixed caliper or in other forms of brakes, such as drum brakes, in which for reasons of their construction the spacing of the abutment from the brake body must be adjusted directly.

The support element of the friction brake of the invention need not necessarily be subjected to compressive stress; it can also be subjected to tensile stress. In principle, the construction and function are unchanged for the self-boosting device functioning as the support element.

As a result of the setting of the spacing between the abutment and the brake body, the support angle at which the support element braces the friction brake lining obliquely to the brake body upon braking can change. In this way, the magnitude of the self-boosting is adjustable and settable. If the coefficient of friction between the friction brake lining and the brake body varies, self-boosting that is close to a locking limit can also always be established. For pressing against the friction brake lining, a comparatively slight actuating force is therefore all that needs to be exerted by the actuating device. Hence a comparatively low-power and hence lightweight, small actuating device can therefore be used, which however should have a high adjusting speed for the sake of high dynamics. In a distinction from this, the adjusting device should be capable of exerting a strong adjusting force, in order to be able to adjust the spacing of the abutment from the brake body and thus the self-boosting, even when a high contact pressure of the friction brake lining is exerted against the brake body. In that case, a low adjusting speed suffices for the adjusting device, and it can therefore also be comparatively low in power.

The invention thus has the advantage that with a comparatively low-power actuating device and adjusting device, it makes a friction brake with high dynamics (tightening speed) and a high braking force extending up to the locking limit possible.

The adjusting device according to one embodiment is preferably self-inhibiting, which is understood to mean a switchover of the adjusting device to a blocking state. As a result, the adjusting device maintains its position, once it has assumed it, without change, without having to be supplied with electrical current.

Another feature provides a pivot angle limitation of the support element. As a result, the friction brake can be tightened with the adjusting device and thus serves as a parking brake.

Advantageous methods for actuating the friction brake are also described.

BRIEF DESCRIPTION OF THE DRAWING

The invention will be better understood and further objects and advantages thereof will become more apparent from the ensuing detailed description of a preferred embodiment taken in conjunction with the sole drawing FIGURE which is a simplified schematic illustration of a friction brake of the invention, looking radially toward a brake body.

DESCRIPTION OF THE PREFERRED EMBODIMENT

The friction brake of the invention, shown in the drawing, is embodied as a disk brake 10. It has a brake caliper 12, which is embodied as a floating caliper; that is, it is displaceable transversely to a brake disk 14, which forms a brake body. A first friction brake lining 16 and a second friction brake lining 18 are disposed in the brake caliper 12, and between them is the brake disk 14.

The first friction brake lining 16 is braced on the brake caliper 12 via a support lever 20 and is pivotably connected to one end, toward the brake disk 14, of the support lever 20 by means of a journal bearing 22. The support lever 20 is in turn braced pivotably on the brake caliper 12 by means of a journal bearing 24. This journal bearing 24 forms an abutment for the support lever 20 on the brake caliper 12 and will hereinafter also be called by that term. The support lever 20 can also be generally called a support element. The support lever 20 forms a self-boosting device of the disk brake 10, which will be described in still further detail below in terms of the function of the disk brake 10.

For its actuation, the disk brake 10 has an actuating device 25, which includes an electric motor 26 with a pinion 28 that meshes with a plate gear segment 30, which is mounted on an end of the support lever 20 remote from the first friction brake lining 16. The term plate gear segment 30 means that a toothing extends not over a full circle but instead over only a limited arc-shaped segment. In the drawing, the toothing of the plate gear segment 30 is located on a side of the support lever 20 remote from the observer and is therefore represented by dashed lines. In the region of the plate gear segment 30, the support lever 20 is embodied in the shape of a hammer, so as to accommodate the plate gear segment. The pinion 28 of the electric motor 26 is for the most part covered by the plate gear segment 30 and is therefore likewise represented by dashed lines. For actuating the disk brake 10, the support lever 20 is pivoted by means of the electric motor 26, and as a result the first friction brake lining 16 comes to rest on and is pressed against the braking surface of the brake disk 14. This will be explained in still further detail below in terms of the function of the disk brake 10.

The brake caliper 12 has two stops 32, which are abutted by ends of the plate gear segment 30 of the support lever 20, when the support lever 20 has been pivoted far enough. The stops 32 form a pivot angle limitation for the support lever 20 and define a pivot angle of the support lever 20 in both pivoting directions.

The second friction brake lining 18 is adjustable transversely to the brake disk 14 by an adjusting device 34. The adjusting device 34 has an electric motor 36, which is embodied as a so-called hollow-shaft motor; that is, it has a hollow shaft 38, which forms its rotor. Stator windings of the electric motor 36 of the adjusting device 34 are identified at 40. A nut 42 is pressed into the hollow shaft 38 of the electric motor 36 in a manner fixed against relative rotation and is in engagement with a spindle 44. The nut 42 and the spindle 44 form a spindle drive 46 for converting a rotational driving motion of the electric motor 36 into a translational motion for displacing the second friction brake lining 18 transversely to the brake disk 14, this second friction brake lining being disposed on an end of the spindle 44 toward the brake disk 14. The spindle drive 46 is embodied as self-inhibiting. The nut 42 of the spindle drive 46 is braced rotatably on the brake caliper 12 via an axial ball bearing 48.

Since the brake caliper 12 is embodied as a floating caliper and is displaceable transversely to the brake disk 14, it is possible, by adjustment of the second friction brake lining 18 with the adjusting device 34, to set a spacing of the journal bearing 24, with which the support lever 20 is pivotably connected to the brake caliper 12, from the brake disk 14. As already noted, the journal bearing 24 forms the abutment of the support lever 20 on the brake caliper 12.

In principle, for actuating the disk brake 10, one of the two friction brake linings 16, 18 can be selectively pressed against the brake disk 14. The respective other friction brake lining 16, 18, because the brake caliper 12 is embodied as a floating caliper, is pressed against the brake disk 14 by a transverse displacement of the brake caliper 12. Provision is made for actuation of the disk brake 10 by pivoting of the support lever 20 by means of the electric motor 26. If the first friction brake lining 16 is in contact with the rotating brake disk 14, the brake disk 14 exerts a frictional force on the first friction brake lining 16 parallel to the brake disk 14. Via the bracing of the first friction brake lining 16 by the support lever 20, which is oblique to the brake disk 14 by a support angle $\alpha$, the frictional force exerted by the rotating brake disk 14 on the first friction brake lining 16 brings about a pressing force of the friction brake lining 16 against the brake disk 14, in addition to a pressing force that is brought to bear by means of the electric motor 26, by pivoting of the support lever 20. The result is a self-boosting; only some of the pressing force required for braking has to be brought to bear by the electric motor 26. The magnitude of the self-boosting is dependent on the support angle $\alpha$; the smaller the support angle $\alpha$, the greater the self-boosting.

The support angle $\alpha$ is set by means of a motion of the second friction brake lining 18 transversely to the brake disk 14 by the adjusting device 34; as explained above, as a result of the motion of the second friction brake lining 18 transversely to the brake disk 14, the spacing of the journal bearing 24, which forms the abutment for the support lever 20 on the brake caliper 12, from the brake disk 14 is finally set or adjusted. According to the invention, with the adjusting device 34, the self-boosting of the disk brake 10 is set high, to enable actuating the brake disk 10 with the electric motor 26, with low actuating force and actuating energy. A safety margin from self-inhibition of the disk brake 10, which would lead to locking of the brake disk 14, is maintained. The actuating device 25 can therefore be embodied with comparatively low power. It preferably has a high speed of motion, so that it can quickly tighten and release the disk brake 10 and quickly change the braking force. Since the self-boosting of the disk brake 10 can be adapted to different coefficients of friction with the adjusting device 34, the actuating device 25 need not be embodied with major power reserves for low coefficients of friction between the first friction brake lining 16 and the brake disk 14, for instance in wet conditions or if the brakes get hot.

Since the spindle drive 46 of the adjusting device 34 is self-inhibiting, the adjusting device 34 needs to be supplied with current only for moving the second friction brake lining 18. To enable adjusting the adjusting device 34 even when the disk brake 10 is actuated with high tightening force, the adjusting device is preferably designed with a high adjusting force, that is, with an especially great step-down of the spindle drive 46. Since the adjustment travel distance is slight, a comparatively low speed of motion of the adjusting device 34 suffices; it can thus also be embodied with comparatively low power.

For instance, if a lower coefficient of friction between the first friction brake lining 16 and the brake disk 14 must be expected from the very outset, for instance in wet conditions, then from the outset a higher self-boosting is set with the adjusting device 34; that is, the support angle $\alpha$ is set by means of a greater spacing of the journal bearing 24, forming the abutment for the support lever 20, from the brake disk 14, or in the final analysis by moving the second friction brake lining 18 away from the brake disk 14. If the coefficient of friction increases during braking, for instance from drying out, the self-boosting is reduced, by increasing the support angle $\alpha$ by moving the second friction brake lining 18 toward the brake disk 14 with the adjusting device 34. Synchronously with the motion of the second friction brake lining 18, the support lever 20 is pivoted with the actuating device 25. If the coefficient of friction between the first friction brake lining 16 and the brake disk 14 decreases during a braking event, for instance if the brake disk 14 and the first friction brake lining 16 get hot, then the support angle $\alpha$ is decreased by moving the second friction brake lining 18 away from brake disk 14, and the self-boosting of the disk brake 10 is increased as a result. In this case as well, the support lever 20 is pivoted accordingly with the actuating device 25, in order to compensate for the motion of the second friction brake lining 18.

An increase or decrease in the coefficient of friction during a braking event can be deduced from an increasing or decreasing braking force, with no change in the actuating force of the disk brake 10. An increasing or decreasing braking force can be ascertained from an increasing or decreasing deceleration of a braked vehicle, which is associated with a wheel rpm that is decreasing faster, or more slowly. The wheel rpm can be ascertained with wheel rotation sensors, which are present in vehicles that have anti-lock brakes (ABS). Vehicles with vehicle dynamics control have an acceleration sensor, with which the change in deceleration upon braking can be measured. If none of these sensors is present, then a brake force sensor (not shown) may be provided on the disk brake 10.

If during a braking event the coefficient of friction has changed and the adjusting device 34 has accordingly been adjusted, then one feature of the invention provides restoring the adjusting device 34 to its original value as a function of time. The restoration time is based on an estimate, for instance of the cooling down of the brake disk 14 or of the effect of wet conditions on the brake disk.

Upon a reversal of the travel direction (a change to travelling in reverse), which for instance can also be ascertained with rotation direction sensors or by shifting into reverse gear, the second friction brake lining 18 is moved away from the brake disk 14 with the adjusting device 34, and the support lever 20 is pivoted with the actuating device 25 past its position that is perpendicular to the brake disk 14, in a bracing direction that is obliquely opposite the reversed direction of rotation of the brake disk 14. Next, the second friction brake lining 18 is moved back toward the brake disk 14 again.

For realizing a parking brake function, the support lever 20 is pivoted enough that it contacts one of the stops 32, and the disk brake 10 is tightened with the adjusting device 34, which by its embodiment with high adjusting force is capable of exerting a sufficiently high braking force to realize the parking brake function. Because of the self-inhibiting embodiment of the spindle drive 46 of the adjusting device 34, the braking force brought to bear is maintained when the adjusting device 34 is without current (and when the actuating device 25 is without current). The support lever 20 can be pivoted against the stop 32 with the electric motor 26, or with the adjusting device 34.

The foregoing relates to a preferred exemplary embodiment of the invention, it being understood that other variants and embodiments thereof are possible within the spirit and scope of the invention, the latter being defined by the appended claims.

We claim:

1. A friction brake with mechanical self-boosting for a motor vehicle, comprising
    a brake body to be braked, said brake body having a braking surface,
    a first friction brake lining,
    a support element pivotably connected to and supporting the first brake lining,
    an abutment pivotably connected to and bracing the first friction brake lining upon braking at a support angle that is oblique to the brake body to be braked,
    an actuating device, with which the support element is pivotable and the first friction brake lining can as a result be pressed against the braking surface of the brake body, and
    an adjusting device (34), operable to adjust a spacing of the abutment (24) from the braking surface of the brake body (14).

2. The friction brake of claim 1, wherein the adjusting device (34) is self-inhibiting.

3. The friction brake of claim 1, wherein the support element (20) comprises means (32) for limiting the support angle.

4. The friction brake of claim 1, wherein the friction brake (10) is a disk brake with a floating caliper (12), having a second friction brake lining (18) on a side, remote from the first friction brake lining (16), of a brake disk (14) forming the brake body, and wherein the adjusting device (34) moves the second friction brake lining (18) transversely to the brake disk (14).

5. A friction brake with mechanical self-boosting for a motor vehicle, comprising
    a brake body to be braked, said brake body having a braking surface,
    a first friction brake lining,
    a support element pivotably connected to and supporting the first brake lining,
    an abutment pivotably connected to the support element so as to brace the first friction brake lining upon braking at a support angle that is oblique to the brake body to be braked,
    an actuating device, with which the support element is pivotable and the first friction brake lining can as a result be pressed against the braking surface of the brake body, and
    an adjusting device (34), operable to adjust a spacing of the abutment (24) from the braking surface of the brake body (14) so that the amount of force necessary from the actuating device to obtain the proper pressure of the first friction brake lining against the brake body can be adjusted.

6. The friction brake of claim 5, wherein the adjusting device (34) is self-inhibiting.

7. The friction brake of claim 5, wherein the support element (20) comprises means (32) for limiting the support angle.

8. The friction brake of claim 5, wherein the friction brake (10) is a disk brake with a floating caliper (12), having a second friction brake lining (18) on a side, remote from the first friction brake lining (16), of a brake disk (14) forming the brake body, and wherein the adjusting device (34) moves the second friction brake lining (18) transversely to the, brake disk (14).

* * * * *